(12) United States Patent
Mohan et al.

(10) Patent No.: US 7,267,627 B2
(45) Date of Patent: Sep. 11, 2007

(54) TORQUE VECTORING AXLE ASSEMBLY

(75) Inventors: Sankar K. Mohan, Jamesville, NY (US); Anupam Sharma, East Syracuse, NY (US); Thomas C. Bowen, Rochester Hills, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 204 days.

(21) Appl. No.: 11/226,993

(22) Filed: Sep. 15, 2005

(65) Prior Publication Data
US 2006/0079369 A1 Apr. 13, 2006

Related U.S. Application Data

(63) Continuation-in-part of application No. 10/852,620, filed on May 24, 2004, now Pat. No. 7,086,982.

(51) Int. Cl.
F16H 48/20 (2006.01)

(52) U.S. Cl. .................. 475/221; 475/225; 475/249

(58) Field of Classification Search ............... 475/205, 475/221, 223, 225, 230, 231, 249
See application file for complete search history.

(56) References Cited

U.S. PATENT DOCUMENTS

| 672,620 | A | 6/1901 | Buffum |
| 856,703 | A | 6/1907 | Iversen |
| 1,382,289 | A | 6/1921 | Janicki |
| 1,954,686 | A | 4/1934 | Stickney |
| 1,964,956 | A | 7/1934 | Lincoln |
| 2,466,683 | A | 4/1949 | Buckendale |
| 3,690,426 | A | 9/1972 | Weisgerber |
| 6,607,061 | B2 * | 8/2003 | Hori et al. ............... 192/84.91 |
| 7,175,557 | B2 * | 2/2007 | Kirkwood et al. .......... 475/150 |
| 7,175,558 | B2 * | 2/2007 | Puiu et al. .................. 475/225 |

FOREIGN PATENT DOCUMENTS

JP 11-105573 * 4/1999

* cited by examiner

*Primary Examiner*—Ha D. Ho
(74) *Attorney, Agent, or Firm*—Harness, Dickey & Pierce, P.L.C.

(57) ABSTRACT

A drive axle assembly includes first and second axleshafts connected to a pair of wheels and a drive mechanism operable to selectively couple a driven input shaft to one or both of the axleshafts. The drive mechanism includes a differential, a speed changing unit operably disposed between the differential assembly and the first and second axleshafts, first and second mode clutches and a brake unit. The first mode clutch is operable to increase the rotary speed of the first axleshaft which, in turn, causes a corresponding decrease in the rotary speed of the second axleshaft. The second mode clutch is operable to increase the rotary speed of the second axleshaft so as to cause a decrease in the rotary speed of the first axleshaft. The brake unit is operable to engage the speed changing unit. A control system controls actuation of both mode clutches.

21 Claims, 10 Drawing Sheets

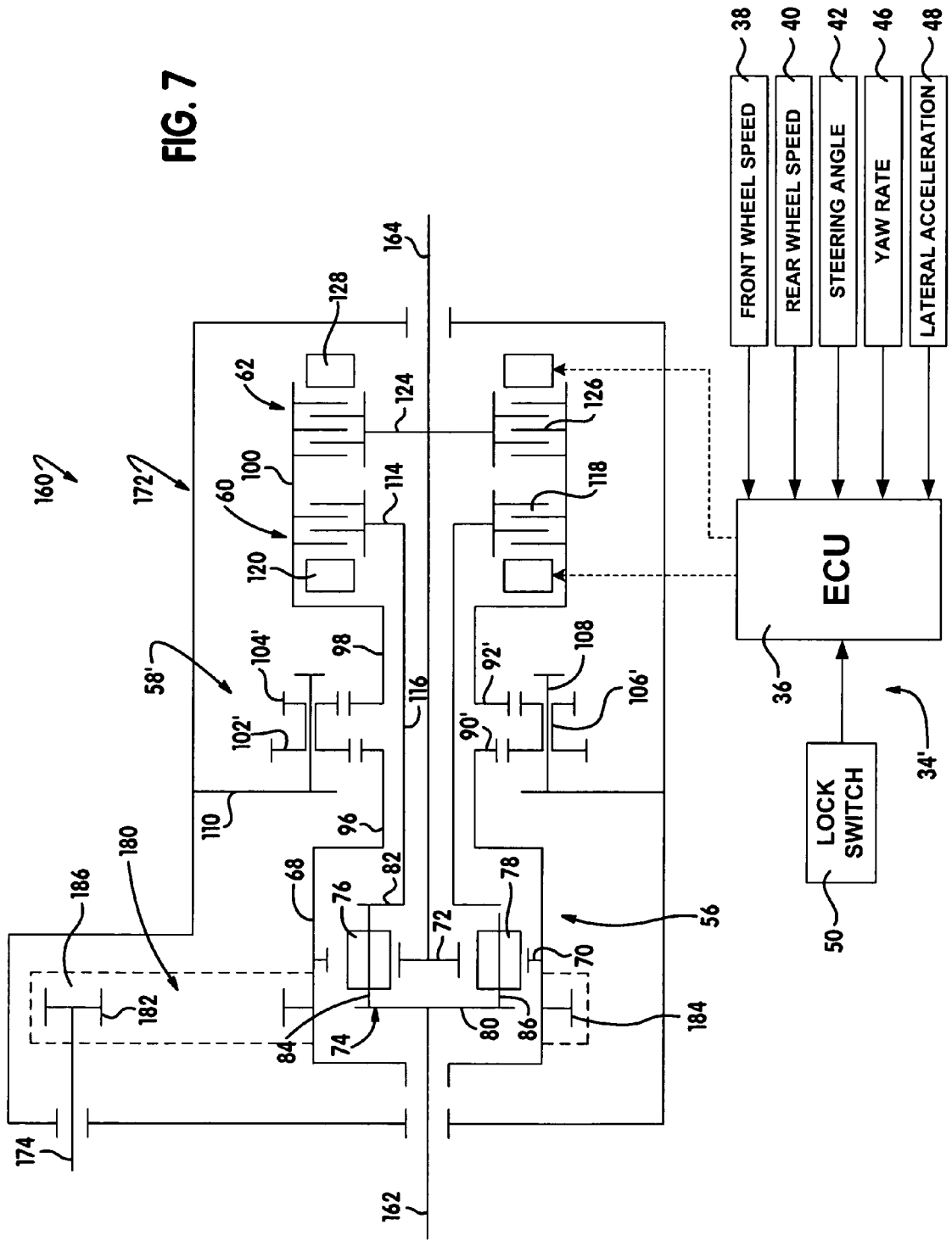

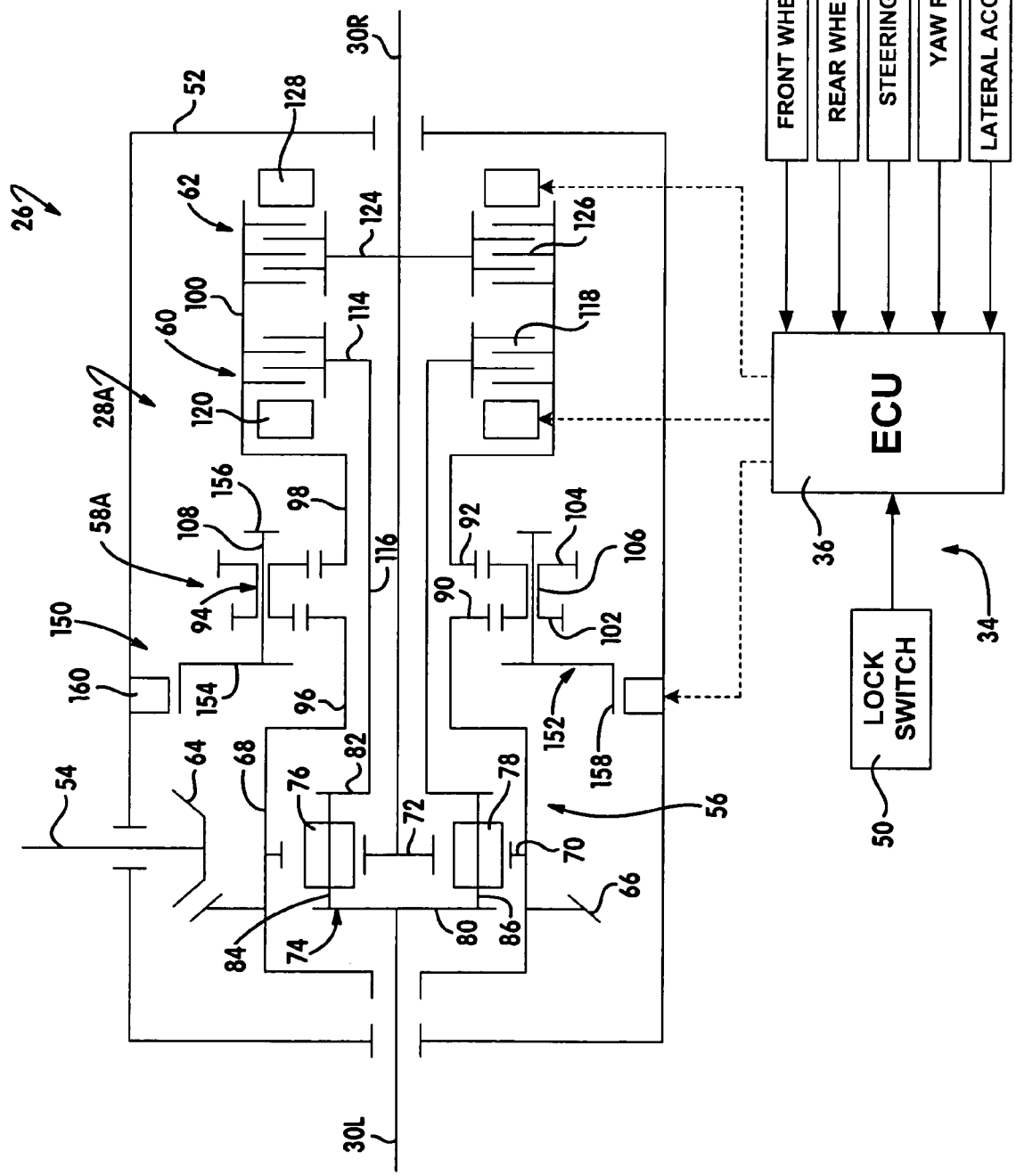

TORQUE VECTORING AXLE ASSEMBLY

CROSS-REFERENCE TO RELATED APPLICATIONS

This application is a continuation-in-part of U.S. patent application Ser. No. 10/852,620 filed on May 24, 2004 now U.S. Pat. No. 7,086,982.

FIELD OF THE INVENTION

The present invention relates generally to differential assemblies for use in motor vehicles and, more specifically, to a differential assembly equipped with a torque vectoring drive mechanism and an active control system.

BACKGROUND OF THE INVENTION

In view of consumer demand for four-wheel drive vehicles, many different power transfer system are currently utilized for directing motive power ("drive torque") to all four-wheels of the vehicle. A number of current generation four-wheel drive vehicles may be characterized as including an "adaptive" power transfer system that is operable for automatically directing power to the secondary driveline, without any input from the vehicle operator, when traction is lost at the primary driveline. Typically, such adaptive torque control results from variable engagement of an electrically or hydraulically operated transfer clutch based on the operating conditions and specific vehicle dynamics detected by sensors associated with an electronic traction control system. In conventional rear-wheel drive (RWD) vehicles, the transfer clutch is typically installed in a transfer case for automatically transferring drive torque to the front driveline in response to slip in the rear driveline. Similarly, the transfer clutch can be installed in a power transfer device, such as a power take-off unit (PTU) or in-line torque coupling, when used in a front-wheel drive (FWD) vehicle for transferring drive torque to the rear driveline in response to slip in the front driveline. Such adaptively-controlled power transfer system can also be arranged to limit slip and bias the torque distribution between the front and rear drivelines by controlling variable engagement of a transfer clutch that is operably associated with a center differential installed in the transfer case or PTU.

To further enhance the traction and stability characteristics of four-wheel drive vehicles, it is also known to equip such vehicles with brake-based electronic stability control systems and/or traction distributing axle assemblies. Typically, such axle assemblies include a drive mechanism that is operable for adaptively regulating the side-to-side (i.e., left-right) torque and speed characteristics between a pair of drive wheels. In some instances, a pair of modulatable clutches are used to provide this side-to-side control, as is disclosed in U.S. Pat. Nos. 6,378,677 and 5,699,888. According to an alternative drive axle arrangement, U.S. Pat. No. 6,520,880 discloses a hydraulically-operated traction distribution assembly. In addition, alternative traction distributing drive axle assemblies are disclosed in U.S. Pat. Nos. 5,370,588 and 6,213,241.

As part of the ever increasing sophistication of adaptive power transfer systems, greater attention is currently being given to the yaw control and stability enhancement features that can be provided by such traction distributing drive axles. Accordingly, this invention is intended to address the need to provide design alternatives which improve upon the current technology.

SUMMARY OF THE INVENTION

Accordingly, it is an objective of the present invention to provide a drive axle assembly for use in motor vehicles which is equipped with an adaptive yaw control system.

To achieve this objective, the drive axle assembly of the present invention includes first and second axleshafts connected to a pair of wheels and a torque distributing drive mechanism that is operable for transferring drive torque from a driven input shaft to the first and second axleshafts. The torque distributing drive mechanism includes a differential, a speed changing unit, first and second mode clutches and a brake unit. The differential includes an input component driven by the input shaft, a first output component driving the first axleshaft and a second output component driving the second axleshaft. The speed changing unit includes a first shaft driven by the input component, a second shaft and a gearset for changing the rotary speed of the second shaft relative to the first shaft. The first mode clutch is operable for selectively coupling the first output component of the differential to the second shaft. Likewise, the second mode clutch is operable for selectively coupling the second output component of the differential to the second shaft. The brake unit is operable for selectively engaging the gearset. Accordingly, selective control over actuation of one or both of the first and second mode clutches and the brake unit provides adaptive control of the speed differentiation and the torque transferred between the first and second axleshafts. A control system including and ECU and sensors are provided to control actuation of both mode clutches and the brake unit.

According to one preferred embodiment, the speed changing unit of the torque distributing drive mechanism is an overdrive unit that is operable to increase the rotary speed of the second shaft relative to the first shaft. As such, engagement of the first mode clutch results in the first axleshaft being overdriven relative to the second axleshaft. Additionally, engagement of the second mode clutch results in the second axleshaft being overdriven relative to the first axleshaft.

According to an alternative preferred embodiment, the speed changing unit of the torque distributing drive mechanism is an underdrive unit that is operable to decrease the rotary speed of the second shaft relative to the first shaft. As such, engagement of the first mode clutch results in the first axleshaft being underdriven relative to the second axleshaft. In contrast, engagement of the second mode clutch results in the second axleshaft being underdriven relative to the first axleshaft.

Pursuant to an alternative objective of the present invention, the torque distributing drive mechanism can be utilized in a power transfer unit, such as a transfer case, of a four-wheel drive vehicle to adaptively control the front-rear distribution of drive torque delivered from the powertrain to the front and rear wheels.

Further objectives and advantages of the present invention will become apparent by reference to the following detailed description of the preferred embodiments and the appended claims when taken in conjunction with the accompanying drawings.

BRIEF DESCRIPTION OF THE DRAWINGS

The present invention will become more fully understood from the detailed description and the accompanying drawings, wherein:

FIG. 7 is a schematic drawing of the power transfer unit shown in FIG. 6;

FIGS. 8 and 8A are schematic illustrations of another alternative embodiment of the torque distributing differential assembly of the present invention.

DETAILED DESCRIPTION OF THE PREFERRED EMBODIMENTS

Figure 1:
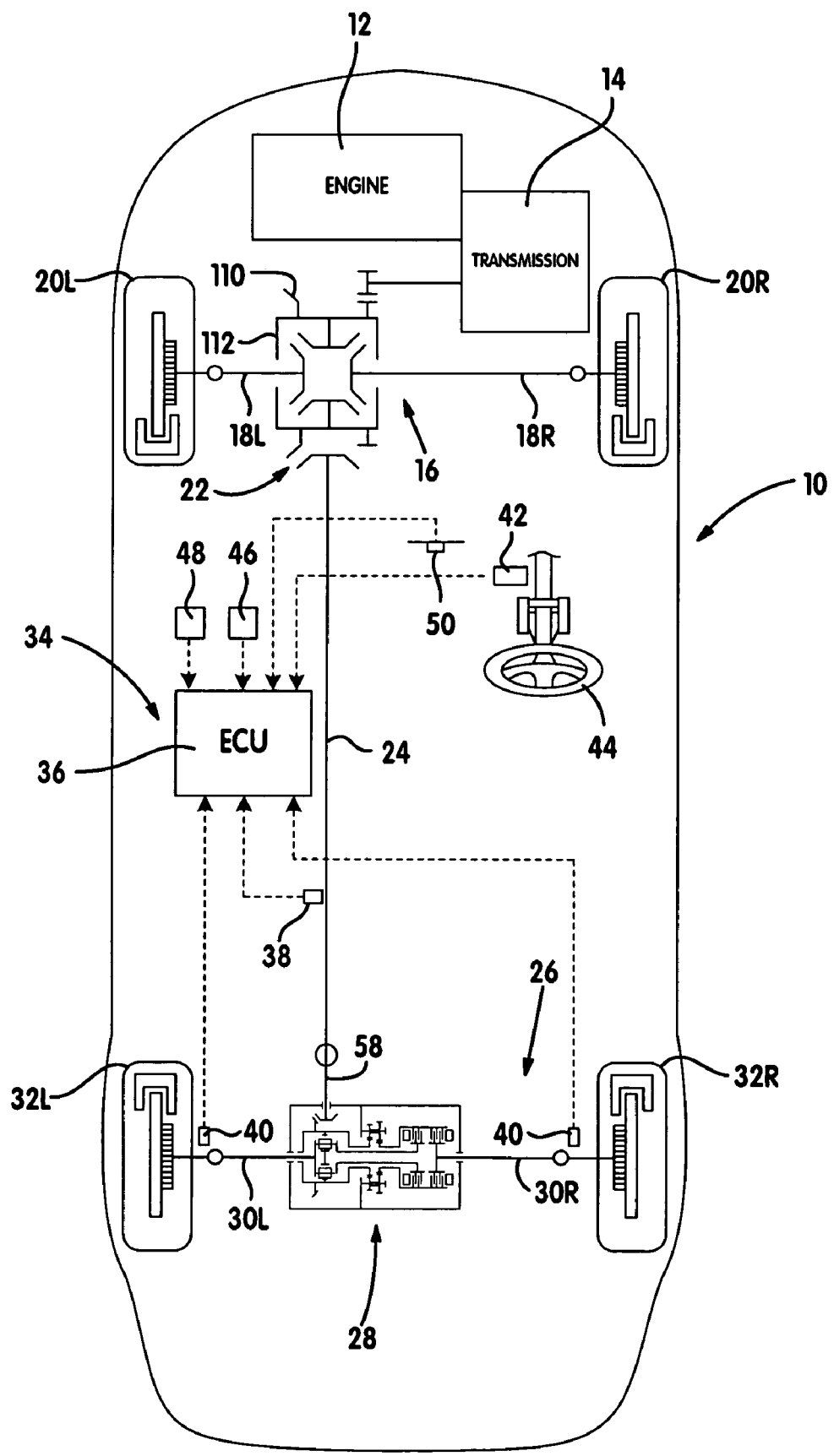
FIG. 1 is a diagrammatical illustration of an all-wheel drive motor vehicle equipped with a drive axle having a torque distributing differential assembly and an active yaw control system according to the present invention.

Referring to FIG. 1, an all-wheel drive vehicle 10 includes an engine 12 transversely mounted in a front portion of a vehicle body, a transmission 14 provided integrally with engine 12, a front differential 16 which connects transmission 14 to front axleshafts 18L and 18R and left and right front wheels 20L and 20R, a power transfer unit ("PTU") 22 which connects front differential 16 to a propshaft 24, and a rear axle assembly 26 having a torque distributing drive mechanism 28 which connects propshaft 24 to axleshafts 30L and 30R for driving left and right rear wheels 32L and 32R. As will be detailed, drive mechanism 28 is operable in association with a yaw control system 34 for controlling the transmission of drive torque through axleshafts 30L and 30R to rear wheels 32L and 32R.

In addition to an electronic control unit (ECU) 36, yaw control system 34 includes a plurality of sensors for detecting various operational and dynamic characteristics of vehicle 10. For example, a front wheel speed sensor 38 is provided for detecting a front wheel speed value based on rotation of propshaft 24, a pair of rear wheel speed sensors 40 are operable to detect the individual rear wheel speed values based rotation of left and right axle shafts 30L and 30R, and a steering angle sensor 42 is provided to detect the steering angle of a steering wheel 44. The sensors also include a yaw rate sensor 46 for detecting a yaw rate of the body portion of vehicle 10, a lateral acceleration sensor 48 for detecting a lateral acceleration of the vehicle body, and a lock switch 50 for permitting the vehicle operator to intentionally shift drive mechanism 28 into a locked mode. As will be detailed, ECU 36 controls operation of a pair of mode clutches associated with drive mechanism 28 by utilizing a control strategy that is based on input signals from the various sensors and lock switch 50.

Rear axle assembly 26 includes an axle housing 52 within which drive mechanism 28 is rotatably supported. In general, torque distributing drive mechanism 28 includes an input shaft 54, a differential 56, a speed changing unit 58, a first mode clutch 60 and a second mode clutch 62. As seen, input shaft 54 includes a pinion gear 64 that is in constant mesh with a hypoid ring gear 66. Ring gear 66 is fixed for rotation with a drive case 68 associated with differential 56. As seen, differential 56 is a planetary gearset having an annulus ring gear 70 fixed for common rotation with drive case 68, a sun gear 72 fixed for rotation with right axleshaft 30R, a differential carrier 74 fixed for rotation with left axleshaft 30L, and meshed pairs of first planet gears 76 and second planet gears 78. First planet gears 76 are shown to be meshed with sun gear 72 while second planet gears 78 are meshed with annulus ring gear 70. Differential carrier 74 is a multi-piece assembly having a front carrier ring 80 interconnected to a rear carrier ring 82 with first and second pins 84 and 86, respectively, extending therebetween and on which corresponding first and second planet gears 76 and 78 are rotatably supported. Differential 56 is operable to transfer drive torque from drive case 68 to axleshafts 30L and 30R at a ratio defined by the gear components while permitting speed differentiation therebetween. Preferably, a 50/50 torque split ratio is established by differential 56 for use in this particular drive axle application. It should be understood that differential 56 is merely intended to represent one differential arrangement applicable for use with the present invention and that other know planetary and hypoid-type differentials could be substituted for use with the present invention.

Speed changing unit 58 includes a gearset having an input sun gear 90, an output sun gear 92, and a plurality of equally-spaced compound gears 94. Speed changing unit 58 also includes a first shaft 96 which connects input sun gear 90 for common rotation with drive case 68 and a second shaft 98 which connects output sun gear 92 for common rotation with a clutch drum 100 associated with both first mode clutch 60 and second mode clutch 62. Compound gears 94 each include a first speed gear 102 that is interconnected to a second speed gear 104 via an integral hub segment 106. Furthermore, first speed gear 102 of each compound gear 94 is meshed with input sun gear 90 while its corresponding second speed gear 104 is meshed with output sun gear 92. Compound gears 94 are rotatably supported on pins 108 that are fixed to a support plate segment 110 of housing 52.

In operation, speed changing unit 58 functions to cause a change in the rotary speed of second shaft 98 relative to the rotary speed of first shaft 96. In particular, the speed ratio established between first shaft 96 and second shaft 98 is based on the size and number of teeth for each gear component of speed changing unit 58. In accordance with one first preferred arrangement, speed changing unit 58 is an overdrive unit that is operable to increase the speed of second shaft 98 relative to first shaft 96, thereby causing a corresponding increase in the rotary speed of clutch drum 100 relative to drive case 68 of differential 56. To accomplish such a speed increase, it is contemplated that input sun gear 90 could have 27 teeth and output sun gear 92 could have 24 teeth while both first speed gear 102 and second speed gear 104 of compound gears 94 could each have 17 teeth pursuant to one non-limiting example for speed changing unit 58.

Figure 2:
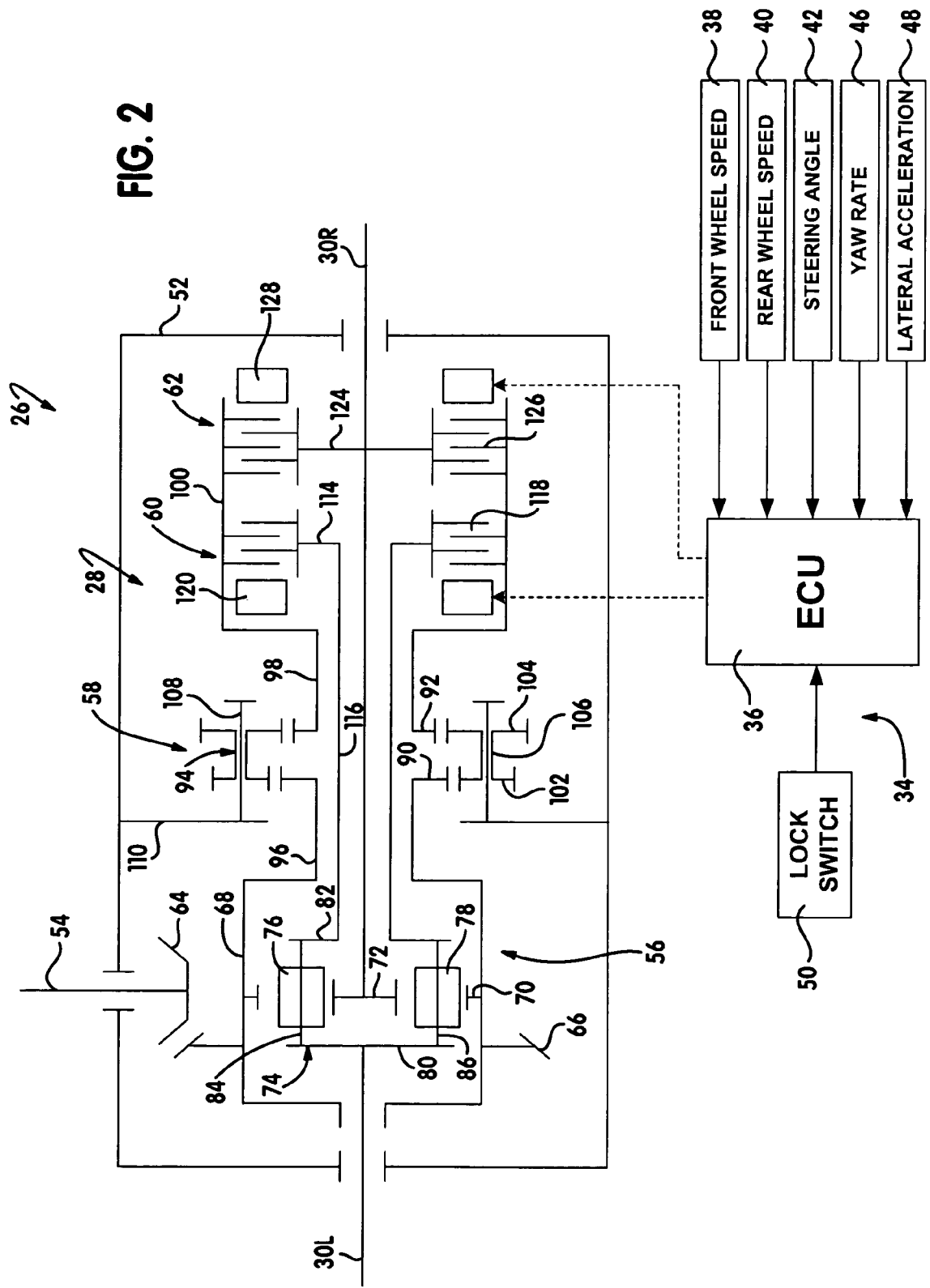
FIG. 2 is a schematic illustration of the torque distributing differential assembly shown in FIG. 1.
Figure 3:
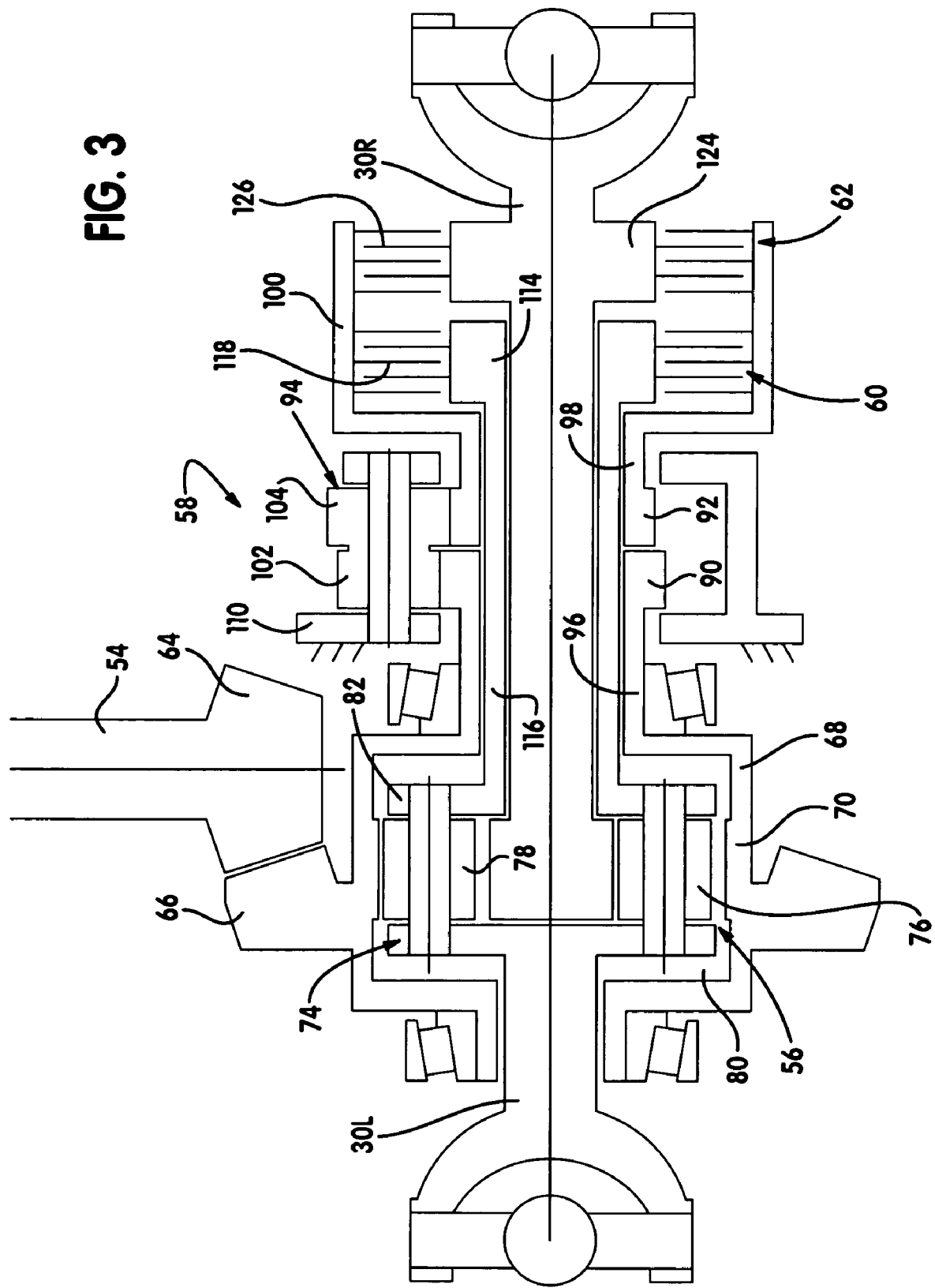
FIG. 3 is another illustration of the torque distributing differential assembly shown in FIGS. 1 and 2.

With continued reference to FIGS. 2 and 3, first mode clutch 60 is shown to be operably disposed between differential carrier 74 and clutch drum 100. In particular, a clutch hub 114 of first mode clutch 60 is connected to rear carrier ring 82 of differential carrier 74 via a third shaft 116. As seen, third shaft 116 surrounds right axleshaft 30R while both of first shaft 96 and second shaft 98 surround third shaft 116. First mode clutch also includes a multi-plate clutch pack 118 that is operably disposed between drum 100 and hub 114 and a power-operated clutch actuator 120. First mode clutch 60 is operable in a first or "released" mode so as to permit unrestricted rotation of second shaft 98 relative to third shaft 116. In contrast, first mode clutch 60 is also operable in a second or "locked" mode to couple third shaft 116 for common rotation with second shaft 98.

As will be recalled, speed changing unit 58 is driven by drive case 68 of differential 56 and functions to increase the rotary speed of second shaft 98. Thus, first mode clutch 60 functions in its locked mode to increase the rotary speed of differential carrier 74 which, in turn, causes a corresponding increase in the rotary speed of left axleshaft 30L. Such an increase in the rotary speed of left axleshaft 30R causes differential 56 to drive right axleshaft 30R at a corresponding reduced speed, thereby directing more drive torque to left axleshaft 30L than is transmitted to right axleshaft 30R. First mode clutch 60 is shifted between its released and locked modes via actuation of power-operated clutch actuator 120 in response to control signals from ECU 36. Specifically, first mode clutch 60 is operable in its released mode when clutch actuator 120 applies a predetermined minimum cutch engagement force on clutch pack 118 and is further operable in its locked mode when clutch actuator 120 applies a predetermined maximum clutch engagement force on clutch pack 118.

Second mode clutch 62 is shown to be operably disposed between right axleshaft 30R and clutch drum 100. In particular, second mode clutch 62 includes a clutch hub 124 that is fixed for rotation with right axleshaft 30R, a multi-plate clutch pack 126 disposed between hub 24 and drum 100, and a power-operated clutch actuator 128. Second mode clutch 62 is operable in a first or "released" mode so as to permit unrestricted relative rotation between axleshaft 30R and second shaft 98. In contrast, second mode clutch 62 is also operable in a second or "locked" mode to couple axleshaft 30R for common rotation with second shaft 98. Thus, second mode clutch 62 functions in its locked mode to increase the rotary speed of right axleshaft 30R which, in turn, causes differential 56 to decrease the rotary speed of left axleshaft 30L, thereby directing more drive torque to right axleshaft 30R than is directed to left axleshaft 30L. Second mode clutch 62 is shifted between its released and locked modes via actuation of power-operated clutch actuator 128 in response to control signals from ECU 36. In particular, second mode clutch 62 operates in its released mode when clutch actuator 128 applies a predetermined minimum clutch engagement force on clutch pack 126 while it operates in its locked mode when clutch actuator 128 applies a predetermined maximum clutch engagement force on cutch pack 126.

Figure 4:
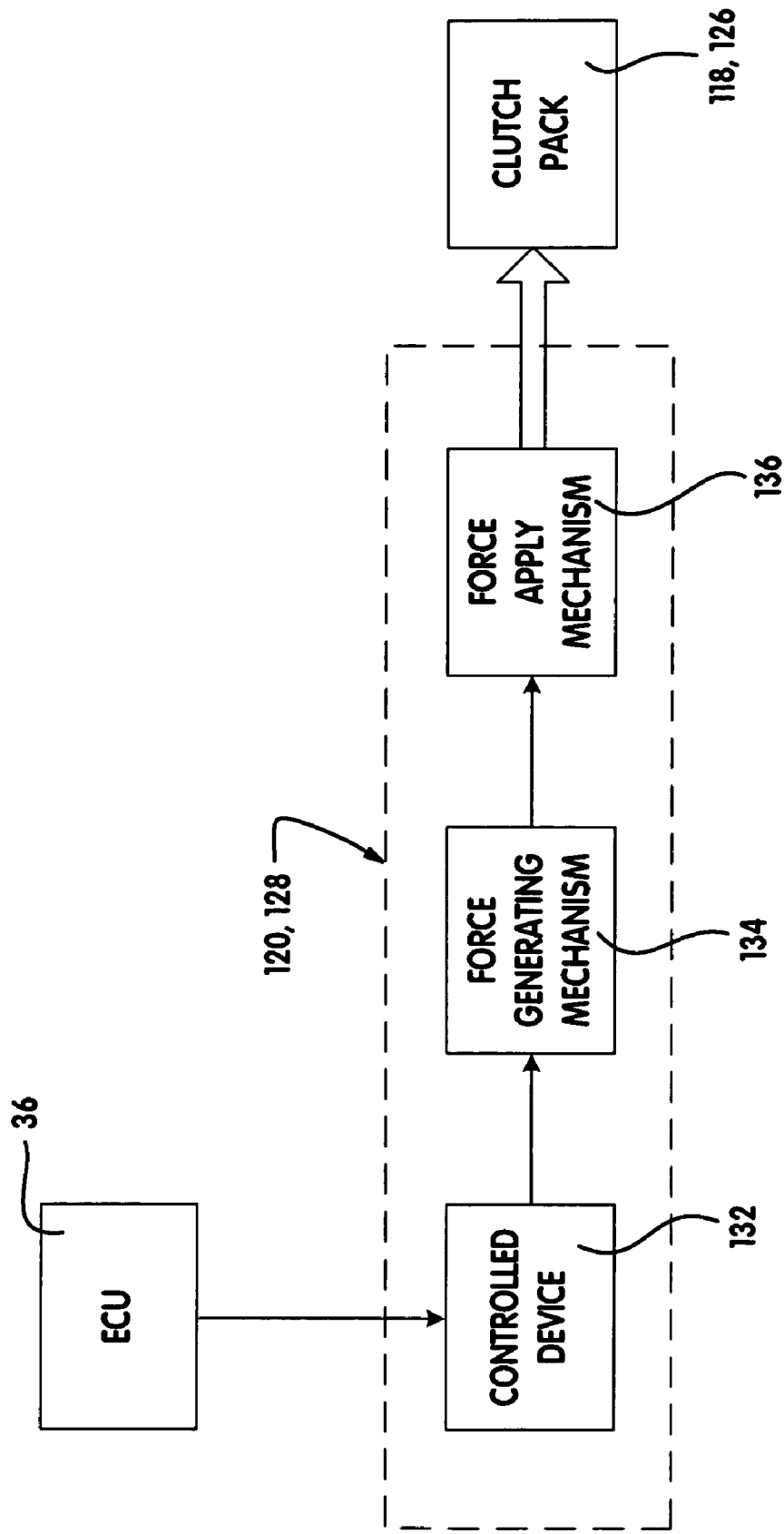
FIG. 4 is a diagrammatical illustration of the power-operated actuators associated with the torque distributing differential assembly of the present invention.

As seen, power-operated clutch actuators 120 and 128 are shown in schematic fashion to cumulatively represent the components required to accept a control signal from ECU 36 and generate a clutch engagement force to be applied to corresponding clutch packs 118 and 126. To this end, FIG. 4 diagrammatically illustrates the basic components associated with such power-operated clutch actuators. Specifically, each power-operated actuator includes a controlled device 132, a force generating mechanism 134, and a force apply mechanism 136. In electromechanical systems, controlled device 132 would represent such components as, for example, an electric motor or an electromagnetic solenoid assembly capable of receiving an electric control signal from ECU 36. The output of controlled device 132 would drive force generating mechanism 134 which could include, for example, a ball ramp, a ball screw, a leadscrew, a pivotal lever arm, rotatable cam plates, etc., each of which is capable of converting the output of controlled device 132 into a clutch engagement force. Finally, force apply mechanism 136 functions to transmit and exert the clutch engagement force generated by force generating mechanism 134 onto clutch packs 118 and 126 and can include, for example, an apply plate or a thrust plate. If a hydra-mechanical system is used, controlled device 132 could be an electrically-operated control valve that is operable for controlling the delivery of pressurized fluid from a fluid source to a piston chamber. A piston disposed for movement in the piston chamber would act as force generating mechanism 134. Preferably, controlled device 132 is capable of receiving variable electric control signals from ECU 36 for permitting variable regulation of the magnitude of the clutch engagement force generated and applied to the clutch packs so as to permit "adaptive" control of the mode clutches.

In accordance with the arrangement shown, torque distributing drive mechanism 28 is operable in coordination with yaw control system 34 to establish at a least four distinct operational modes for controlling the transfer of drive torque from input shaft 54 to axleshafts 30L and 30R. In particular, a first operational mode is established when first mode clutch 60 and second mode clutch 62 are both in their released mode such that differential 56 acts as an "open" differential so as to permit unrestricted speed differentiation with drive torque transmitted from drive case 68 to each axleshaft 30L, 30R based on the tractive conditions at each corresponding rear wheel 32L, 32R. A second operational mode is established when both first mode clutch 60 and second mode clutch 62 are in their locked mode such that differential 56 acts as a "locked" differential with no speed differentiation permitted between rear axleshafts 30L, 30R. This mode can be intentionally selected via actuation of lock switch 50 when vehicle 10 is being operated off-road or on poor roads.

A third operational mode is established when first mode clutch 60 is shifted into its locked mode while second mode clutch 62 is operable in its released mode. As a result, left axleshaft 30L is overdriven at the same increased speed as second speed gear 104. As noted, such an increase in the rotary speed of left axleshaft 30L causes a corresponding speed reduction in right axleshaft 30R. Thus, this third operational mode causes right axleshaft 30R to be underdriven while left axleshaft 30L is overdriven when required to accommodate the current tractive or steering condition detected and/or anticipated by ECU 36 based on the particular control strategy used. Likewise, a fourth operational mode is established when first mode clutch 60 is shifted into its released mode and second mode clutch 62 is shifted into its locked mode. As a result, right rear axleshaft 30R is overdriven relative to drive case 68 which, in turn, causes left axleshaft 30L to be underdriven at a corresponding reduced speed. Thus, this fourth operational mode causes right axleshaft 30R to be overdriven while left axleshaft 30L is underdriven when required to accommodate the current tractive or steering conditions detected and/or anticipated by ECU 36.

At the start of vehicle 10, power from engine 12 is transmitted to front wheels 20L and 20R through transmission 14 and front differential 16. Drive torque is also transmitted to torque distributing drive mechanism 28 through PTU 22 and propshaft 24 which, in turn, rotatably drives input pinion shaft 58. Typically, mode clutches 60 and 62 would be non-engaged such that drive torque is transmitted through differential 56 to rear wheels 32L and 32R.

However, upon detection of lost traction at front wheels 20L and 20R, one or both mode clutches 60 and 62 can be engaged to provide drive torque to rear wheels 32L and 32R based on the tractive needs of the vehicles.

In addition to on-off control of the mode clutches to establish the various drive modes associated with overdrive connections through speed changing unit 58, it is further contemplated that variable clutch engagement forces can be generated by power-operated actuators 120 and 128 to adaptively regulate the left-to-right speed and torque characteristics. This "adaptive" control feature functions to provide enhanced yaw and stability control for vehicle 10. For example, a reference yaw rate can be determined based on several factors including the steering angle detected by steering angle sensor 42, the vehicle speed as calculated based on signals from the various speed sensors, and a lateral acceleration as detected by lateral acceleration sensor 48. ECU 36 compares this reference yaw rate with an actual yaw rate value detected by yaw sensor 46. This comparison will determine whether vehicle 10 is in an understeer or an oversteer condition so as to permit yaw control system 34 to be adaptively control actuation of the mode clutches to accommodate these types of steering tendencies. ECU 36 can address such conditions by shifting drive mechanism 28 into the specific operative drive mode that is best suited to correct the actual or anticipated oversteer or understeer situation. Optionally, variable control of the mode clutches also permits adaptive regulation of the side-to-side torque transfer and speed differentiation characteristics if one of the distinct drive modes is not adequate to accommodate the current steer tractive condition.

Figure 5:
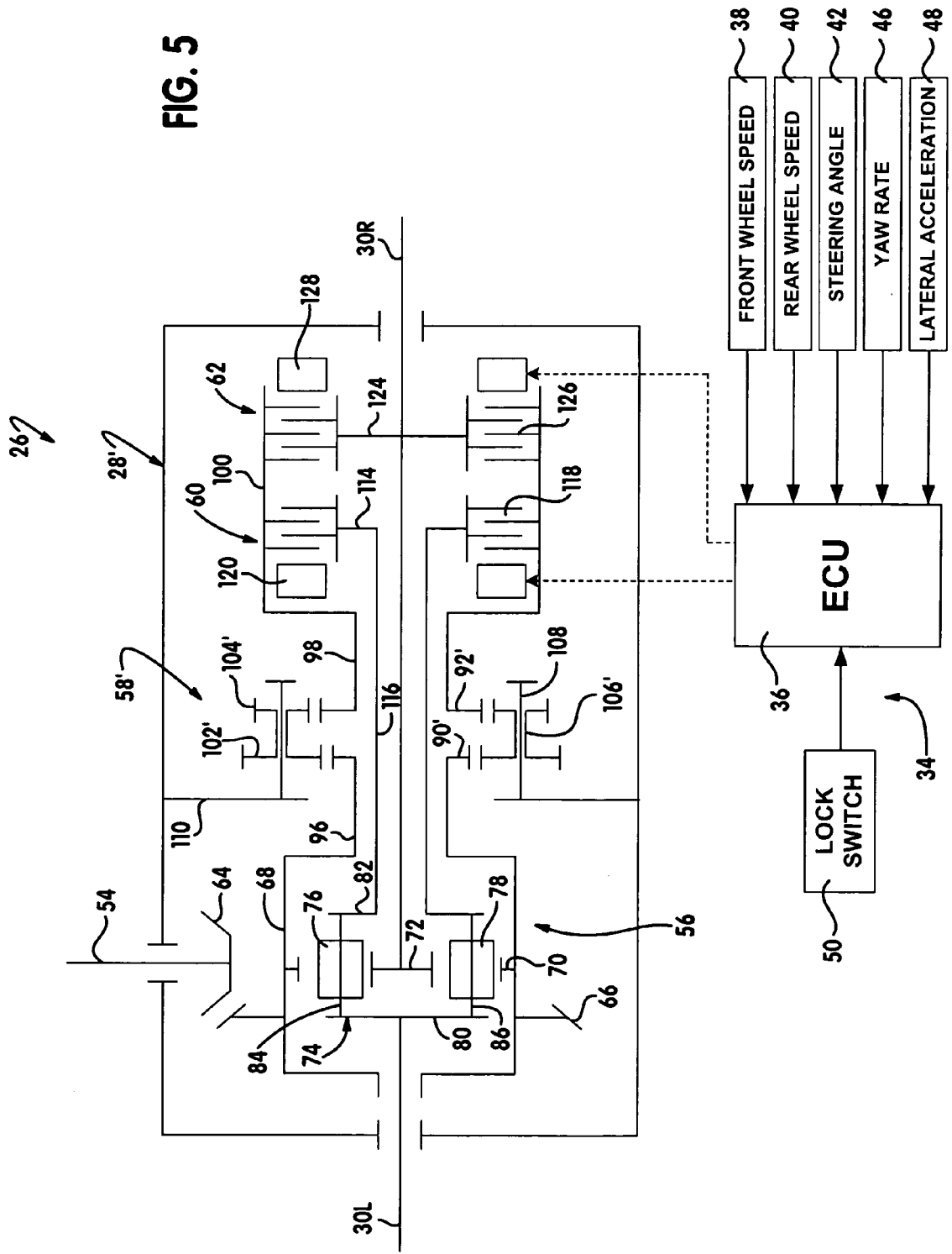
FIG. 5 is a schematic illustration of an alternative embodiment of the torque distributing differential assembly of the present invention.

Referring now to FIG. 5, an alternative embodiment of torque distributing drive mechanism 28 of FIG. 2 is shown and designated by reference numeral 28'. Generally speaking, a large number of components are common to both drive mechanism 28 and 28', with such components being identified by the same reference numbers. However, drive mechanism 28' is shown to include a modified speed changing unit 58'. In particular, speed changing unit 58' is a speed reducing or "underdrive" gearset which includes an input sun gear 90', an output sun gear 92', and compound gears 94'. Each compound gear 94' includes a first speed gear 102' meshed with input sun gear 90' and a second speed gear 104' meshed with output sun gear 92'. An integral hub segment 106' interconnects first speed gear 102' for common rotation with second speed gear 104'. In essence, speed changing unit 58' is now arranged to reduce the speed of second shaft 98 relative to first shaft 96 at a reduction ratio determined by the gear components. To accomplish this speed reduction feature, it is contemplated that input sun gear 90' could have 24 teeth and output sun gear 92' could have 27 teeth while first speed gear 102' and second speed gear 104' each still could have 17 teeth pursuant to one non-limiting example.

Drive mechanism 28' is similar but slightly different in operation compared to drive mechanism 28 in that first mode clutch 60 now functions to cause left axleshaft 30L to be underdriven relative to right axleshaft 30R while second mode clutch 62 functions to cause right axleshaft 30R to be underdriven relative to left axleshaft 30L. As such, the four distinct operational modes previously described are again available and can be established by drive mechanism 28' via selective actuation of power-operated clutch actuators 120 and 128.

Figure 6:
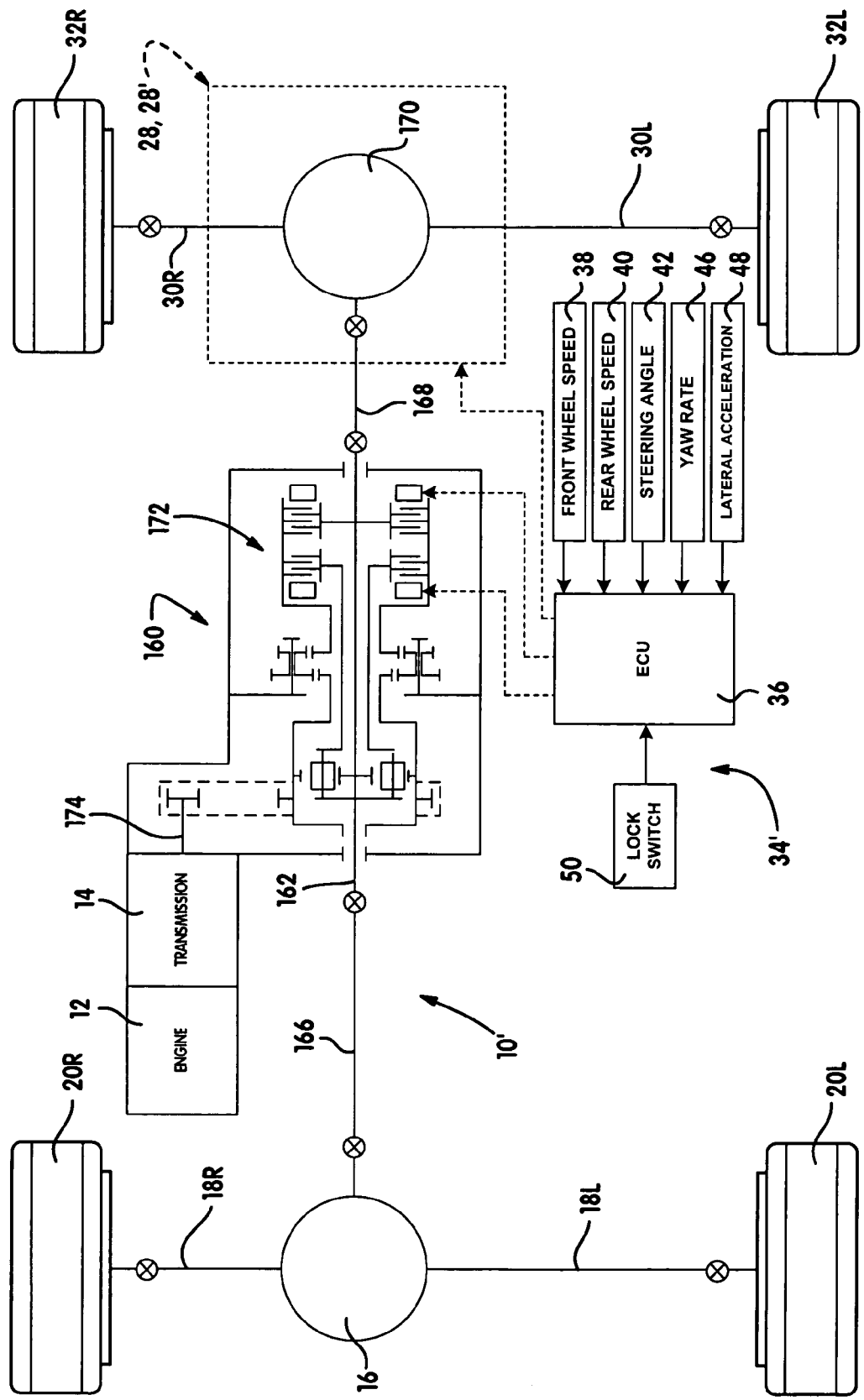
FIG. 6 is a diagrammatical illustration of the torque distributing differential assembly of the present invention installed in a power transfer unit for use in a four-wheel drive vehicle.

Referring now to FIG. 6, a four-wheel drive vehicle 10' is shown equipped with a power transfer unit 160 that is operable for transferring drive torque from the output of transmission 14 to a first (i.e., front) output shaft 162 and a second (i.e., rear) output shaft 164. Front output shaft 162 drives a front propshaft 166 which, in turn, drives front differential 16 for driving front wheels 20L and 20R. Likewise, rear output shaft 164 drives a rear propshaft 168 which, in turn, drives a rear differential 170 for driving rear wheels 32L and 32R. Power transfer unit 160, otherwise known as a transfer case, includes a torque distributing drive mechanism 172 which functions to transmit drive torque from its input shaft 174 to both of output shafts 162 and 164 so as to bias the torque distribution ratio therebetween, thereby controlling the tractive operation of vehicle 10'. As seen, torque distribution mechanism 172 is operably associated with a traction control system 34' for providing this adaptive traction control feature for vehicle 10'.

Referring primarily to FIG. 7, torque distribution mechanism 172 of power transfer unit 160 is shown to be generally similar in structure to drive mechanism 28' of FIG. 5 with the exception that drive case 68 is now drivingly connected to input shaft 174 via a transfer assembly 180. In the arrangement shown, transfer assembly 180 includes a first sprocket 182 driven by input shaft 174, a second sprocket 184 driving drive case 68, and a power chain 186 therebetween. As seen, front output shaft 162 is driven by differential carrier 74 of differential 56 which now acts as a center or "interaxle" differential for permitting speed differentiation between the front and rear output shafts while establishing a full-time four-wheel drive mode. In addition, sun gear 72 of differential 56 drives rear output shaft 164. Also, hub 124 of second mode clutch 62 is shown to be coupled for common rotation with rear output shaft 164.

Control over actuation of mode clutches 60 and 62 results in corresponding increases or decreases in the rotary speed of rear output shaft 164 relative to front output shaft 162, thereby controlling the amount of drive torque transmitted therebetween. In particular, when both mode clutches are released, unrestricted speed differentiation is permitted between the front and rear output shafts while the gear ratio established by the components of interaxle differential 56 controls the front-to-rear torque ratio based on the current tractive conditions of the front and rear wheels. In contrast, with both mode clutches engaged, a locked four-wheel drive mode is established wherein no interaxle speed differentiation is permitted between the front and rear output shafts. Such a drive mode can be intentionally selected via lock switch 50 when vehicle 10' is driven off-road or during severe road conditions. An adaptive full-time four-wheel drive mode is made available under control of traction control system 34' to limit interaxle slip and vary the front-rear drive torque distribution ratio based on the tractive needs of the front and rear wheels as detected by the various sensors. In addition to power transfer unit 160, vehicle 10' could also be equipped with a rear axle assembly having either torque distributing drive mechanism 28 or 28' and its corresponding yaw control system, as is identified by the phantom lines in FIG. 6.

Referring now to FIG. 8, rear axle assembly 26 is shown equipped with a drive mechanism 28A that is generally similar to drive mechanism 28 shown in FIG. 2 except that a brake unit 150 is now provided in association with speed changing unit 58A. Speed changing unit 58A is likewise generally similar to speed changing unit 58 of FIG. 2 except that compound gears 94 are rotatably supported on pins 108 that are now fixed to a rotatable carrier assembly 152 instead of being fixed to stationary support plate segment 110 of housing 52. Carrier assembly 152 includes a pair of laterally-spaced carrier rings 154 and 156 between which pins 108 are mounted. Brake unit 150 is shown to be operably disposed between housing 52 and carrier assembly 152 and includes a brake drum 158 fixed to carrier ring 154 and a power-operated brake actuator 160 mounted to housing 52. Brake unit 150 is operable in a first or "released" mode so as to permit unrestricted rotation of carrier assembly 152 relative to housing 52. In contrast, brake unit 150 is further operable in a second or "braked" mode to prevent rotation of carrier assembly 152. Brake unit 150 is shifted between its released and braked modes via actuation of power-operated brake actuator 160 in response to control signals from ECU 36. Specifically, brake unit 150 is operable in its released mode when brake actuator 160 applies a predetermined minimum brake force on brake drum 158 and is further operable in its braked mode when brake actuator 160 applies a predetermined maximum brake force on brake drum 158.

In accordance with the arrangement shown in FIG. 8, torque distributing drive mechanism 28A is operable in coordination with yaw control system 34 to establish at least five distinct operational modes for controlling the transfer drive torque from input shaft 54 to axleshafts 30L and 30R. In particular, a first operational mode is established when first mode clutch 60, second mode clutch 62 and brake unit 150 are all in their released mode such that differential 56 acts as an open differential so as to permit unrestricted speed differentiation with drive torque transmitted from drive case 68 to axleshafts 30L, 30R based on the traction at wheels 32L, 32R. Moreover, with brake unit 150 released, carrier assembly 152 is not grounded such that drum 100 is not driven by gearset 58A so as to reduce and/or eliminate parasitic losses normally caused by slip across multi-plate clutch packs 118 and 126. A second operational mode is established when first mode clutch 60 and second mode clutch 62 are in their locked modes and brake unit 150 is in either of its released or braked mode such that differential 56 acts as a locked differential with no speed differentiation permitted between rear axleshafts 30L, 30R.

A third operational mode is established when first mode clutch 60 and brake unit 150 are shifted into their respective locked and braked modes while second mode clutch 62 is operable in its released mode. As a result, left axleshaft 30L is overdriven at the same increased speed as second speed gear 104. As noted, such an increase in rotary speed of left axleshaft 30L causes a corresponding reduction in the rotary speed of right axleshaft 30R. Thus, left axleshaft 30L is overdriven while right axleshaft 30R is underdriven to provide a torque vectoring power distribution between left and right wheels 32L and 32R. Likewise, a fourth operational mode is established when first mode clutch 60 is in its released mode, second mode clutch 62 is in its locked mode and brake unit 150 is in its braked mode. As a result, right axleshaft 30R is overdriven relative to drive case 68 which, in turn, causes left axleshaft 30L to be underdriven at a corresponding reduced speed.

Finally, a fifth operational mode is available with drive mechanism 28A when brake unit 150 is in its released mode, first mode clutch 60 in its locked mode and second mode clutch 62 is adaptively modulated between its released and locked modes to provide an adaptive limit slip function without torque vectoring. Such adaptive limit slip control of the torque transferred between axleshafts 30L and 30R across differential 56 enhances the tractive characteristics of the vehicle. A similar limited slip feature is also available if first mode clutch 60 is modulated while second mode clutch 62 is locked and brake unit 150 is in its braked mode.

Figure 8A:
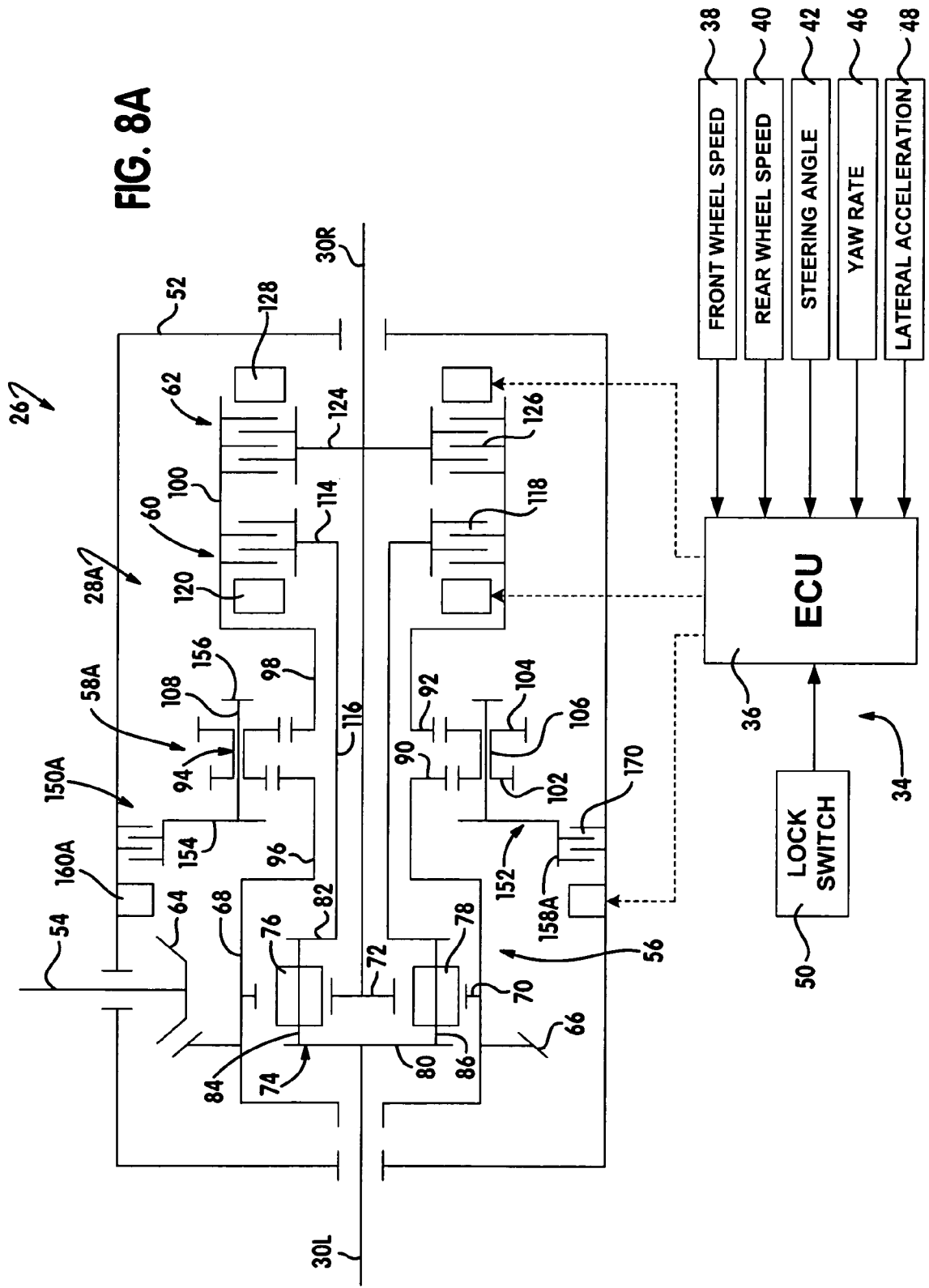

Brake unit 150 is schematically shown in FIG. 8 to illustrate a drum brake type device having brake actuator 160 adapted to mechanically engage or electromechanically act on brake drum 158. For example, it is contemplated that actuator 160 could be generally arranged similar to that shown in FIG. 4 so as to include a controlled device adapted to receive control signals from ECU 36 for actuating a force generating mechanism capable of applying the brake force on brake drum 158. In addition, it is optional that brake unit 150 be arranged as a friction clutch instead of a drum brake device. This alternative arrangement is shown in FIG. 8A wherein a brake unit 150A includes a power-operated clutch actuator 160A and a multi-plate clutch pack 170 operably disposed between brake hub 158A and casing 52.

Figure 9:
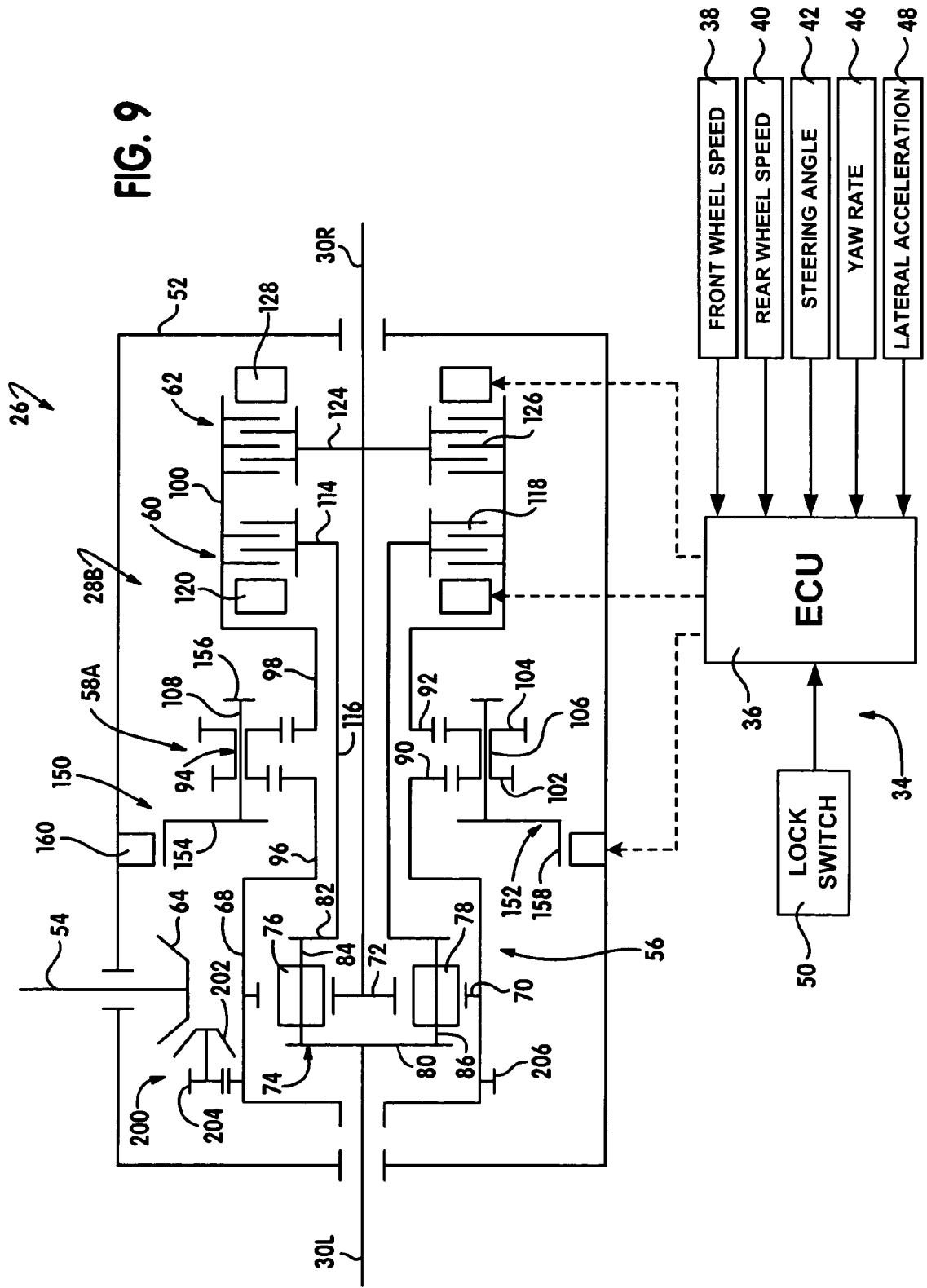
FIG. 9 is a schematic illustration of a modified version of the torque distributing differential assembly shown in FIG. 8.

Referring now to FIG. 9, a "modular" version of drive mechanism 28A from FIG. 8 is shown and identified by reference numeral 28B. In general, drive mechanism 28B permits the final drive ratio that is transmitted between pinion input shaft 54 and drive casing 68 to be easily changed via the use of an intermediate gearset 200. Gearset 200 includes a hypoid pinion gear 202 meshed with drive pinion 64 which drives a transfer gear 204 which, in turn, is meshed with a drive gear 206 fixed to drive case 68.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle, comprising:
a powertrain operable for generating drive torque;
a primary driveline for transmitting drive torque from said powertrain to first and second primary wheels;
a secondary driveline for selectively transmitting drive torque from said powertrain to first and second secondary wheels, said secondary driveline including an input shaft driven by said powertrain, a first axleshaft driving said first secondary wheel, a second axleshaft driving said second secondary wheel, and a drive mechanism disposed between said input shaft and said first and second axleshafts, said drive mechanism including a differential, a speed changing unit, first and second mode clutches and a brake unit, said differential having an input component driven by said input shaft, a first output component driving said first axleshaft and a second output component driving said second axleshaft, said speed changing unit having a first shaft driven by said input component, a second shaft and a gearset for disposed between said first and second shafts, said first mode clutch is operable for selectively coupling said first output component to said second shaft, said second mode clutch is operable for selectively coupling said second output component to said second shaft, and said brake unit is operable for selectively engaging said gearset to permit said second shaft to be driven by said first shaft; and
a control system for controlling actuation of said first and second mode clutches and said brake unit.

2. The motor vehicle of claim 1 wherein said drive mechanism is operable to establish a first overdrive mode when said first mode clutch is engaged, said brake unit is engaged and said second mode clutch is released for overdriving said first axleshaft relative to said input component such that said differential causes said second axleshaft to be underdriven relative to said input component.

3. The motor vehicle of claim 2 wherein said drive mechanism is operable to establish a second overdrive mode when said first mode clutch is released, said brake unit is engaged and said second mode clutch is engaged for overdriving said second axleshaft relative to said input component such that said differential causes said first axleshaft to be underdriven relative to said input component.

4. The motor vehicle of claim 1 wherein said drive mechanism establishes a locked mode when both of said first and second mode clutches are engaged and said brake unit is engaged.

5. The motor vehicle of claim 1 wherein said drive mechanism is operable to establish a first underdrive mode when said first mode clutch is engaged, said brake unit is engaged and said second mode clutch is released such that said first axleshaft is underdriven relative to said input component and said second axleshaft is overdriven relative to said input component.

6. The motor vehicle of claim 5 wherein said drive mechanism is operable to establish a second underdrive mode when said first mode clutch is released, said brake unit is engaged and said second mode clutch is engaged such that said second axleshaft is underdriven relative to said input component and said first axieshaft is overdriven relative to said input component.

7. The motor vehicle of claim 1 wherein said differential includes a ring gear as its input component, a differential carrier as its first output component, a sun gear as its second output component, and planet gears supported by said differential carrier and which are meshed with said ring gear and said sun gear.

8. The motor vehicle of claim 1 wherein said speed changing unit includes an input sun gear driven by said first shaft, an output sun gear driving said second shaft, and speed gears meshing with said input and output sun gears, said speed gears are rotatably supported from a carrier with said brake unit operable to selectively brake rotation of said carrier.

9. The motor vehicle of claim 8 wherein said speed gears include a first gear meshed with said input sun gear which is interconnected to a second gear meshed with said output sun gear.

10. The motor vehicle of claim 1 wherein said first mode clutch includes a first clutch pack disposed between said second shaft and said first output component and a first power-operated clutch actuator operable to generate and exert a clutch engagement force on said first clutch pack, wherein said second mode clutch includes a second clutch pack disposed between said second shaft and said second output component and a second power-operated clutch actuator operable to generate and exert a clutch engagement force on said second clutch pack, wherein said brake unit includes a rotatable brake member coupled to a component of said gearset and a power-operated brake actuator operable to generate and exert a braking force on said brake member, and wherein said control system includes a control unit operable to control actuation of said first and second clutch actuators and said brake actuator.

11. A drive axle assembly for use in a motor vehicle having a powertrain and first and second wheels, comprising:
an input shaft driven by the powertrain;
a first axleshaft driving the first wheel;
a second axleshaft driving the second wheel;
a drive mechanism coupling said input shaft to said first and second axleshafts, said drive mechanism including a differential, a speed changing unit, first and second mode clutches and a brake unit, said differential having an input component driven by said input shaft, a first output component driving said first axleshaft and a second output component driving said second axleshaft, said speed changing unit having a first shaft driven by said input component, a second shaft and a gearset disposed between said first and second shafts, said first mode clutch is operable for selectively coupling said first output component to said second shaft, said second mode clutch is operable for selectively coupling said second output component to said second shaft, and said brake unit is operable for selectively engaging said gearset to permit said second shaft to be driven at a different rotary speed relative to said first shaft; and
a control system for controlling actuation of said first and second mode clutches and said brake unit.

12. The drive axle of claim 11 wherein said drive mechanism is operable to establish a first overdrive mode when said first mode clutch and said brake unit are engaged and said second mode clutch is released such that said first axleshaft is overdriven relative to said input component and said second axleshaft is underdriven relative to said input component.

13. The drive axle of claim 12 wherein said drive mechanism is operable to establish a second overdrive mode when said first mode clutch is released and said second mode clutch and said brake unit are engaged such that said second axleshaft is overdriven relative to said input component and said first axleshaft is underdriven relative to said input component.

14. The drive axle of claim 11 wherein said drive mechanism establishes a locked mode when all of said first and second mode clutches and said brake unit are engaged.

15. The drive axle of claim 11 wherein said drive mechanism is operable to establish a first underdrive mode when said first mode clutch and said brake unit are engaged and said second mode clutch is released such that said first axleshaft is underdriven relative to said input component and said second axleshaft is overdriven relative to said input component.

16. The drive axle of claim 15 wherein said drive mechanism is operable to establish a second underdrive mode when said first mode clutch is released and said second mode clutch and said brake unit are engaged such that said second axleshaft is underdriven relative to said input component and said first axleshaft is overdriven relative to said input component.

17. The motor vehicle of claim 11 wherein said differential includes a ring gear as its input component, a differential carrier as its first output component, a sun gear as its second output component, and planet gears supported by said differential carrier and which are meshed with said ring gear and said sun gear.

18. The drive axle of claim 11 wherein said speed changing unit includes an input sun gear driven by said first shaft, an output sun gear driving said second shaft and speed gears meshing with said input and output sun gears that are supported from a rotatable carrier, said brake unit operable to selectively brake rotation of said carrier.

19. The drive axle of claim 18 wherein said speed gears include a first gear meshed with said input sun gear which is interconnected to a second gear meshed with said output sun gear.

20. The drive axle of claim 18 wherein said first mode clutch includes a first clutch pack disposed between said second shaft and said first output component and a first power-operated clutch actuator operable to generate and exert a clutch engagement force on said first clutch pack, wherein said second mode clutch includes a second clutch pack disposed between said second shaft and said second output component and a second power-operated clutch actuator operable to generate and exert a clutch engagement force on said second clutch pack, wherein said brake unit includes a brake member fixed for rotation with said carrier and a power-operated brake actuator operable to generate and exert a brake force on said brake member and wherein said control system includes a control unit operable to control actuation of said first and second clutch actuators.

21. A drive axle assembly for use in a motor vehicle having a powertrain and first and second wheels, comprising:

an input shaft driven by the powertrain;

a first axleshaft driving the first wheel;

a second axleshaft driving the second wheel;

a differential having a ring gear driven by said input shaft, a sun gear fixed for rotation with said first axleshaft, a differential carrier fixed for rotation with said second axleshaft, and meshed pairs of first and second planet gears rotatably supported by said differential carrier, said first planet gears are meshed with said sun gear and said second planet gears are meshed with said ring gear;

a speed changing unit having a second sun gear driven by said ring gear, a third sun gear and compound planet gears rotatably supported from a planet carrier and having a first speed gear meshed with said second sun gear and a second speed gear meshed with said third sun gear;

a first mode clutch for selectively coupling said third sun gear for rotation with said differential carrier;

a second mode clutch for selectively coupling said third sun gear for rotation with said first axleshaft;

a brake unit for selectively braking rotation of said planet carrier; and a control system for controlling actuation of said first and second mode clutches and said brake unit.

* * * * *